United States Patent [19]
Hibi

[11] Patent Number: 5,267,920
[45] Date of Patent: Dec. 7, 1993

[54] FRICTION ROLLER TYPE CONTINUOUSLY VARIABLE TRANSMISSION

[75] Inventor: Toshifumi Hibi, Kanagawa, Japan

[73] Assignee: Nissan Motor Co., Ltd., Yokohama, Japan

[21] Appl. No.: 871,551

[22] Filed: Apr. 21, 1992

[30] Foreign Application Priority Data

May 28, 1991 [JP] Japan .................. 3-152541

[51] Int. Cl.$^5$ .............................................. F16H 15/08
[52] U.S. Cl. .............................................. 476/40; 476/46
[58] Field of Search ................. 74/190, 199, 200, 201; 476/40, 42, 45

[56] References Cited

U.S. PATENT DOCUMENTS

| | | | |
|---|---|---|---|
| 2,730,904 | 1/1956 | Rennerfelt | 476/45 X |
| 3,820,416 | 6/1974 | Kraus | 74/200 X |
| 4,928,542 | 5/1990 | Nakano | 74/201 X |
| 4,934,206 | 6/1990 | Nakano | 74/200 |
| 4,960,004 | 10/1990 | Hibi et al. | 74/200 |
| 4,968,289 | 11/1990 | Nakano | 74/200 X |
| 5,007,298 | 4/1991 | Machida | 74/201 X |
| 5,027,668 | 7/1991 | Nakano | 74/200 |
| 5,027,669 | 7/1991 | Nakano | 74/200 |
| 5,067,360 | 11/1991 | Nakano | 74/200 |
| 5,083,473 | 1/1992 | Nakano | 74/200 X |

FOREIGN PATENT DOCUMENTS

| | | | |
|---|---|---|---|
| 378813 | 7/1990 | European Pat. Off. | 74/200 |
| 420157 | 4/1991 | European Pat. Off. | 74/200 |
| 62-127555 | 6/1987 | Japan . | |
| 1-225758 | 10/1989 | Japan | 74/200 |
| 2-120548 | 5/1990 | Japan | 74/201 |
| 2-163549 | 5/1990 | Japan . | |
| 2-261950 | 10/1990 | Japan | 74/200 |

Primary Examiner—Leslie A. Braun
Assistant Examiner—David W. Laub
Attorney, Agent, or Firm—Foley & Lardner

[57] ABSTRACT

A thrust cam device is located at a back side of an input disc to bias the input disc toward an output disc in accordance with a torque applied thereto. The thrust cam device includes a drive cam, a back surface of the input disc, groups of cam rollers each being between respective cam surfaces of the drive cam and input disc, and a cam holder disposed between the drive cam and the input disc for rotatably holding the cam rollers. A disc spring is compressed between the input disc and the drive cam for constantly biasing the input disc toward the output disc. The input disc; the cam holder and the drive cam have respectively positioning holes which can be aligned. The positioning hole of the input disc is threaded. Upon requirement of preassembly of the thrust cam device, the input disc, the cam holder and the drive cam are turned to certain positions wherein the positioning holes are aligned, and a bolt is inserted into the aligned positioning holes and screwed into the threaded positioning hole.

2 Claims, 3 Drawing Sheets

FRICTION ROLLER TYPE CONTINUOUSLY VARIABLE TRANSMISSION

BACKGROUND OF THE INVENTION

1. Field of the Invention

The present invention relates in general to continuously variable transmissions for use in motor vehicles, and more particularly to friction roller type continuously variable transmissions in which preassembly of a thrust cam device is assuredly achieved.

2. Description of the Prior Art

One of the conventional continuously variable transmissions of the above-mentioned friction roller type is shown in Japanese Patent First Provisional Publication 2-163549.

The transmission shown in the publication comprises generally an input disc which is rotated together with a torque transmitting shaft and which is axially movable relative to the shaft, an output disc which is rotatable about the torque transmitting shaft and suppressed from moving in an axial direction away from the input disc, friction rollers each being disposed between respective toroidal surfaces of the input and output discs, and a thrust cam device located at a back side of the input disc to bias the input disc toward the output disc.

The thrust cam device comprises a cam surface formed on the back surface of the input disc, a drive cam having a cam surface facing the cam surface of the input disc, and groups of cam rollers each being disposed between the respective cam surfaces of the input disc and the drive cam. The cam rollers of the groups are rotatably held by a common circular cam holder. A torque is transmitted to the drive cam from a torque input shaft. Between the drive cam and the input disc, there is installed a disc spring which produces a preload with which the input disc is constantly biased toward the output disc. The cam surface of the drive cam and that of the input disc are respectively formed with groups of radially extending V-grooves. When no torque is applied to the input shaft, the drive cam assumes a position in which bottom portions of the V-grooves of the drive cam face to bottom portions of the V-grooves of the input disc having the grouped cam rollers received between the opposed bottom portions of the V-grooves of them.

In order to effectively assemble the transmission, preassembly of the thrust cam device by using a knock pin (or snap pin) is usually carried out. That is, in advance, the drive cam, the cam holder of the cam rollers and the input disc have been formed with respective positioning holes which can be aligned when the drive cam, the holder and the input disc assume certain positions. Upon requirement of preassembly, the knock pin is inserted into the aligned positioning holes. Because of the snapping force produced by the knock pin, these three parts are combined to constitute a temporary unit of the thrust cam device.

However, usage of the knock pin sometimes fails to produce a sufficient snapping force with which the thrust cam device keeps its preassembled condition. That is, it sometimes occurs that the snapping force produced by the knock pin is smaller than the biasing force produced by the disc spring. In this case, the knock pin becomes disengaged from the aligned positioning holes and thus the mutual positioning between the drive cam, the holder and the input disc is substantially broken.

SUMMARY OF THE INVENTION

It is therefore an object of the present invention to provide a friction roller type continuously variable transmission having a thrust cam device whose preassembly is assuredly and tightly achieved.

According to a first aspect of the present invention, there is provided a friction roller type continuously variable transmission which comprises axially spaced input and output discs; friction rollers each being disposed between respective toroidal surfaces formed on the input and output discs; a thrust cam device located at a back side of the input disc to bias the input disc toward the output disc in accordance with a torque applied thereto, the thrust cam device including a drive cam having a cam surface, means defining another cam surface on the input disc, groups of cam rollers each being disposed between the cam surfaces of the drive cam and the input disc, and a cam holder disposed between the drive cam and the input disc for rotatably holding the groups of cam rollers; a spring compressed between the input disc and the drive cam for biasing the input disc toward the output disc; and preassembling means capable of tightly combining the input disc, the drive cam and the cam holder while compressing the spring.

According to a second aspect of the present invention, there is provided, in a friction roller type continuously variable transmission including input and output discs, friction rollers disposed between the input and output discs, a thrust cam device located at a back side of the input disc to bias the input disc toward the output disc in accordance with a torque applied thereto, the thrust cam device including a drive cam having a cam surface, means defining another cam surface on the input disc, groups of cam rollers each being disposed between the cam surfaces of the drive cam and the input disc, and a cam holder disposed between the drive cam and the input disc for rotatably holding the groups of cam rollers; and a spring compressed between the input disc and the drive cam for biasing the input disc toward the output disc, a method of temporarily assembling the thrust cam device, which comprises by steps: (a) providing the input disc, the drive cam and the cam holder with respective positioning holes which can be aligned, the positioning hole of the input disc being threaded; (b) manually moving the input disc, the drive cam and the cam holder to certain positions where the three positioning holes are aligned; and (c) inserting a bolt into the aligned positioning holes and screwing the same into the threaded positioning hole of the input disc.

DETAILED DESCRIPTION OF THE INVENTION

Figure 1:
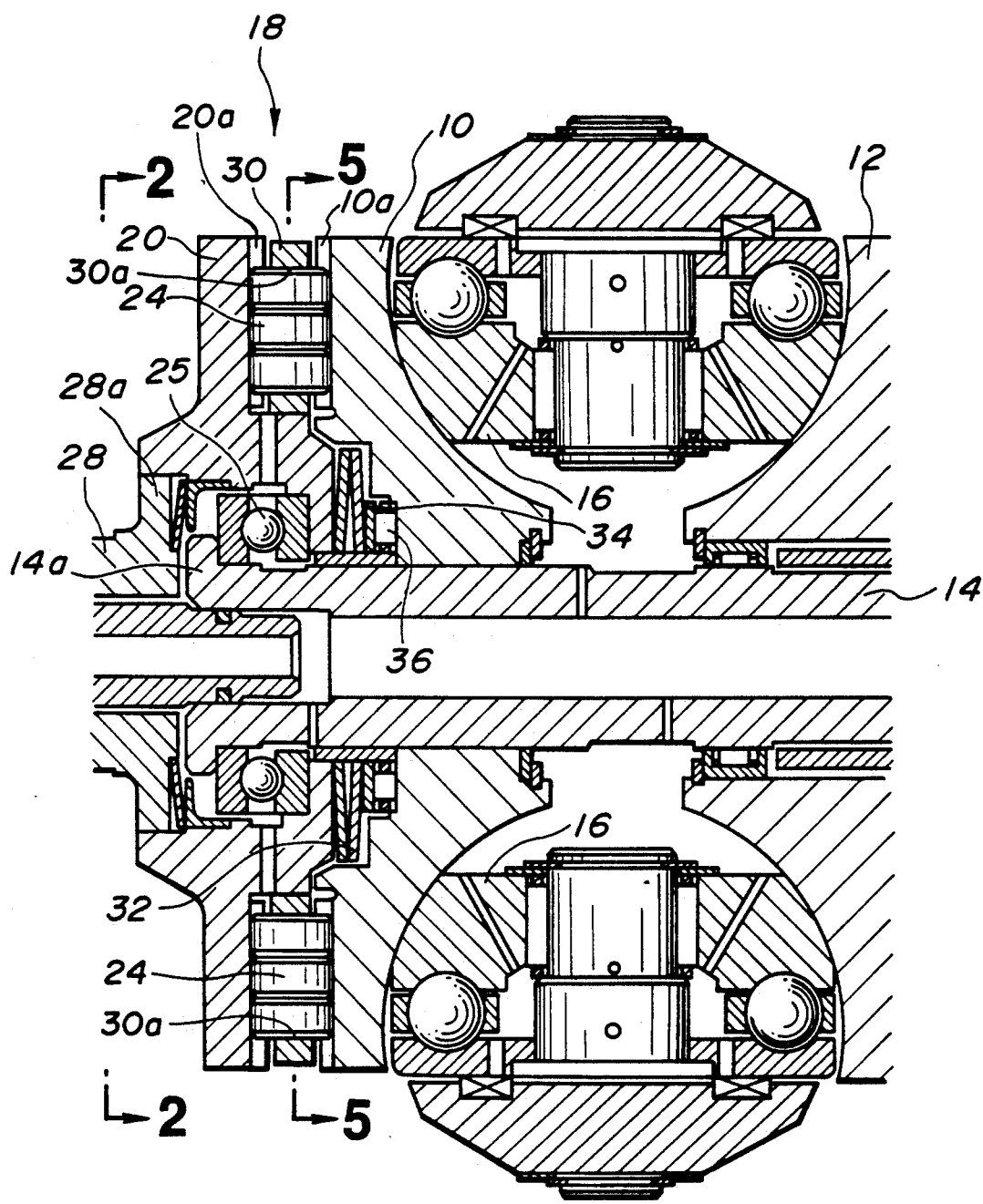
FIG. 1 is a sectional view of an essential part of a friction roller type continuously variable transmission according to the present invention.

Referring to FIG. 1, there is shown but partially a friction roller type continuously variable transmission according to the present invention.

As shown, an input disc 10 is coaxially disposed on a torque transmitting shaft 14 to rotate therewith. An output disc 12 is rotatably disposed about the torque transmitting shaft 14. These discs 10 and 12 respectively have toroidal surfaces which face to each other. Friction rollers 16 are operatively disposed between the toroidal surfaces of the input and output discs 10 and 12.

At a back side of the input disc 10, there is installed a thrust cam device 18. The thrust cam device 18 comprises a drive cam 20, four groups of cam rollers 24, a circular cam holder 30 and a part of the input disc 10, which will be described in detail hereinafter.

The drive cam 20 is rotatable and axially movable relative to the torque transmitting shaft 14. The drive cam 20 shown in FIG. 1 assumes its leftmost position relative to the torque transmitting shaft 14. That is, a leftward movement of the drive cam 20 from the illustrated position is suppressed by a thrust bearing 25 which is mated with a shoulder portion 14a formed on the torque transmitting shaft 14.

Designated by numeral 28 is an input shaft which is coaxial with the torque transmitting shaft 14 and has an end formed with a flange 28a. The flange 28a is connected to the drive cam 20 by means of spline-connection. Thus, the input shaft 28 and the drive cam 20 can rotate together about an axis of the input shaft 28 while permitting a relative axial movement therebetween.

The four groups of cam rollers 24 are rotatably held in the common circular cam holder 30 which is coaxially disposed about a smaller diameter portion of the drive cam 20 and rotatable about the axis of the torque transmitting shaft 14. Each group includes three cam rollers 24 as is seen from FIG. 5. The four groups of cam rollers 24 are each operatively disposed between a cam surface 10a of the input disc 10 and another cam surface 20a of the drive cam 20. The cam surfaces 10a and 20a are so shaped and arranged that when a relative rotation takes place between the input disc 10 and the drive cam 20, the four groups of cam rollers 24 operate to bias them in the directions away from each other.

Between the input disc 10 and the drive cam 20, there is installed a pre-loading device which comprises a disc spring 32, a spacer 34 and a thrust needle bearing 36. A force produced by the disc spring 32 works to bias the input disc 10 and the drive cam 20 away from each other. If desired, a coil spring may be used in place of the disc spring 32. Thus, the pre-loading device and the above-mentioned thrust cam device 18 have parallel relationship with respect to a biasing force applied to the input disc 10 and the drive cam 20.

Figure 2:
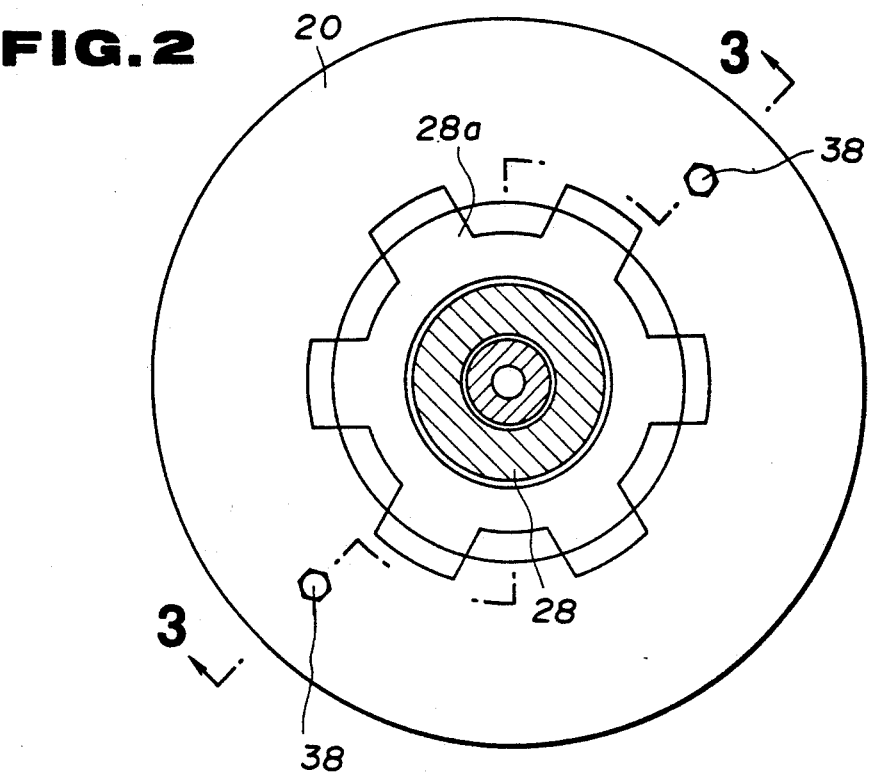
FIG. 2 is a sectional view taken along the line 2—2 of FIG. 1.
Figure 3:
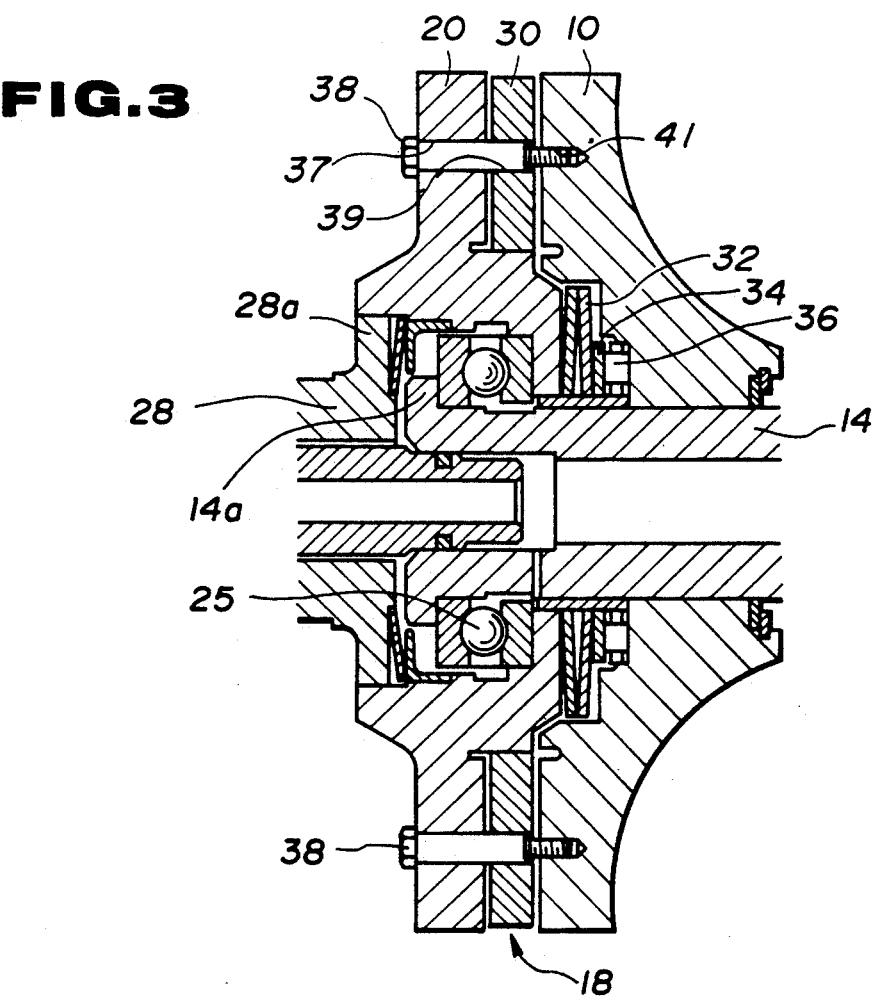
FIG. 3 is a sectional view taken along the line 3—3 of FIG. 2.

FIG. 2 is a sectional view taken along the line 2—2 of FIG. 1, and FIG. 3 is a sectional view taken along the line 3—3 of FIG. 2.

As is understood from FIGS. 2 and 3, the drive cam 20, the cam holder 30 and the input disc 10 are formed with two groups of positioning holes each including a through hole 37 formed in the drive cam 20, a through hole 39 formed in the cam holder 30 and a blind hole 41 formed in the input disc 10. The blind hole 41 is threaded.

Figure 4:
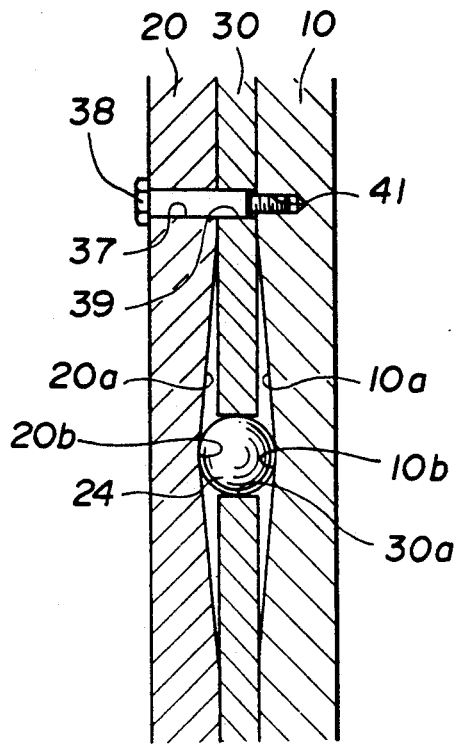
FIG. 4 is a radially expanded view of a thrust cam device under a condition wherein positioning and preassembling of parts are finished.
Figure 5:
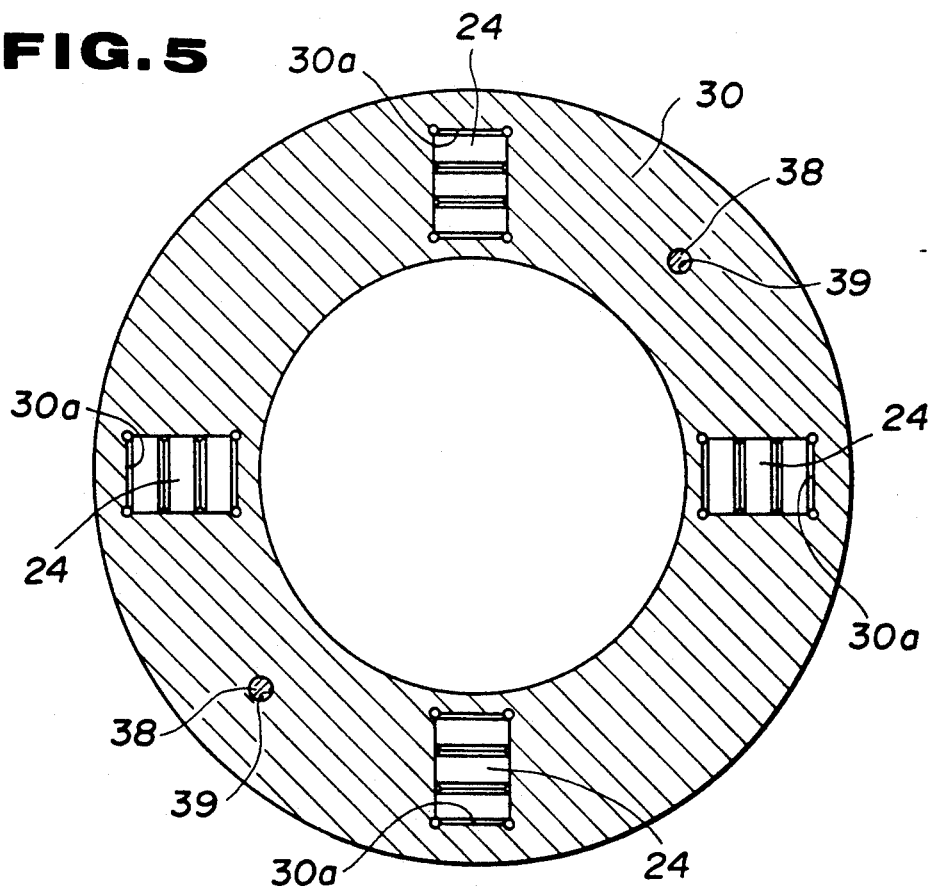
FIG. 5 is a sectional view taken along the line 5—5 of FIG. 1.

As may be understood from FIGS. 4 and 5, the cam surfaces 10a and 20a of the input disc 10 and drive cam 20 are each formed with four radially extending V-grooves 20b or 10b which are located at evenly spaced intervals, that is, at 90-degrees intervals. The four groups of cam rollers 24 are respectively received in four radially extending spaces each being defined by and between opposed V-grooves of the cam surfaces 10a and 20a, as is seen from FIG. 4.

As is seen from FIG. 4, when no torque is applied to the drive cam 20 from the input shaft 28 (see FIG. 1), the drive cam 20 assumes a position in which bottom portions of the four V-grooves 20b of the drive cam 20 face bottom portions of the V-grooves 10b of the input disc 10, and in which the cam rollers 24 of each group are neatly received in the thickest part of the corresponding radially extending space defined by the opposed V-grooves 20b and 10b of the drive cam 20 and the input disc 10.

As is understood from FIGS. 4 and 5, the four groups of cam rollers 24 are rotatably held in four rectangular openings 30a which are formed in the circular cam holder 30 at evenly spaced intervals. The through holes 39 of the cam holder 30 are formed at diametrically opposed portions of the same, and each through hole 39 is positioned halfway between adjacent two groups of cam rollers 24.

In the following, steps for preassembling the thrust cam device 18 will be described.

First, the input disc 10, the drive cam 20, the cam holder 30, the four groups of cam rollers 24, the disc spring 32, the spacer 34 and the thrust needle bearing 36 are mounted on the torque transmitting shaft 14 in such a manner as is shown in FIG. 1. Then, the input disc 10, the drive cam 20 and the cam holder 30 are manually turned to positions wherein the holes 41, 37 and 39 of each group of them are aligned. Then, a bolt 38 for one group is inserted into the aligned holes 37 and 39 and screwed into the blind threaded hole 41, and then another bolt 38 for the other group is inserted into the other aligned holes and screwed into the other blind threaded hole 41.

With this, the preassembly of the thrust cam device 18 is accomplished with the disc spring kept compressed. The bolts 38 are thus used as means for achieving not only positioning of the drive cam 20, the cam holder 30 and the input disc 10 but also preassembling of them. In other words, the through holes 37 and 39, the blind threaded hole 41 and the bolt 38 of each group constitute a means for preassembling the thrust cam device 18. The preassembled condition of the thrust cam device 18 is shown in FIG. 4 which is a radially expanded but partial view of the same.

Due to the tight connection achieved by the bolts 38, the mutual positioning between the input disc 10, the drive cam 20 and the cam holder 30 is kept unchanged during the assembling procedure of the transmission.

Of course, when the thrust cam device 18 thus preassembled is mounted properly on the torque transmitting shaft 14 thereafter, the two bolts 38 should be removed from the device 18.

What is claimed is:

1. A friction roller type continuously variable transmission comprising:
   axially spaced input and output discs, said input disc having a blind threaded hole therein and a first cam surface;
   friction rollers each being disposed between respective toroidal surfaces formed on said input and output discs;

a thrust cam device located at a back side of said input disc to bias said input disc toward said output disc in accordance with a torque applied thereto, said thrust cam device including a drive cam having a second cam surface and a first through hole therein, groups of cam rollers each being disposed between the first and second cam surfaces, and a cam holder having a second through hole therein and being disposed between said drive cam and said input disc, said cam holder rotatably holding said groups of cam rollers;

a spring compressed between said input disc and said drive cam for biasing said input disc toward said output disc; and preassembling means for tightly combining said input disc, said drive cam and said cam holder while compressing said spring, said preassembling means comprising said blind threaded hole, said first through hole, said second through hole, a threaded bolt having an even diameter therethrough except for a threaded end portion, wherein said blind threaded hole, said first through hole and said second through hole are alignable to form a bolt bore when said input disc, said cam holder and said drive cam assume predetermined positions, said threaded bolt being removably received in said bolt bore such that as said threaded bolt is threaded into said blind threaded hole, said input disc, said cam holder and said drive cam are gradually pressed against one another and said spring is gradually compressed; and positioning means for allowing said input disc and said drive cam to assume the closest positions to each other when said preassembling means gradually presses said input disc, said drive cam and said cam holder while compressing said spring, said positioning means including a first radially extending V-groove on said second cam surface, and a second radially extending V-groove on said first cam surface, wherein said first V-groove and said second V-groove face each other and hold therebetween said friction rollers.

2. A friction roller type continuously variable transmission comprising:

axially spaced input and output discs, said input disc having a blind threaded hole therein and a first cam surface;

friction rollers disposed between respective toroidal surfaces formed on said input and output discs;

a drive cam having a second cam surface and a first through hole therein;

groups of cam rollers disposed between said first and second cam surfaces;

a cam holder disposed between said drive cam and said input disc for rotatably holding said groups of cam rollers, said cam holder having a second through hole therein;

a spring compressed between said input disc and said drive cam for biasing said input disc toward said output disc;

preassembling means including said blind threaded hole, said first through hole, said second through hole, and a threaded bolt having an even diameter therethrough except for a threaded end portion, said blind threaded hole, said first through hole and said second through hole being aligned to form a bolt bore when said input disc, said cam holder and said drive cam assume predetermined angular positions, said threaded bolt being capable of entering said bolt bore such that as said threaded bolt is threaded into said blind threaded hole, said input disc, said cam holder and said drive cam are gradually pressed against one another and said spring is gradually compressed; and positioning means for allowing said input disc and said drive cam to assume the closest positions to each other when said preassembling means presses said input disc, said drive cam and said cam holder while compressing said spring, said positioning means including a first radially extending V-groove on said second cam surface, and a second radially extending V-groove on said first cam surface, said first V-groove and said second V-groove facing each other and holding therebetween said friction rollers.

* * * * *